Jan. 3, 1933.　　　　C. G. FLYGARE　　　　1,893,076
HYDRAULICALLY OPERATED CYLINDRICAL GRINDING MACHINE
Filed Sept. 30, 1929　　　5 Sheets-Sheet 4

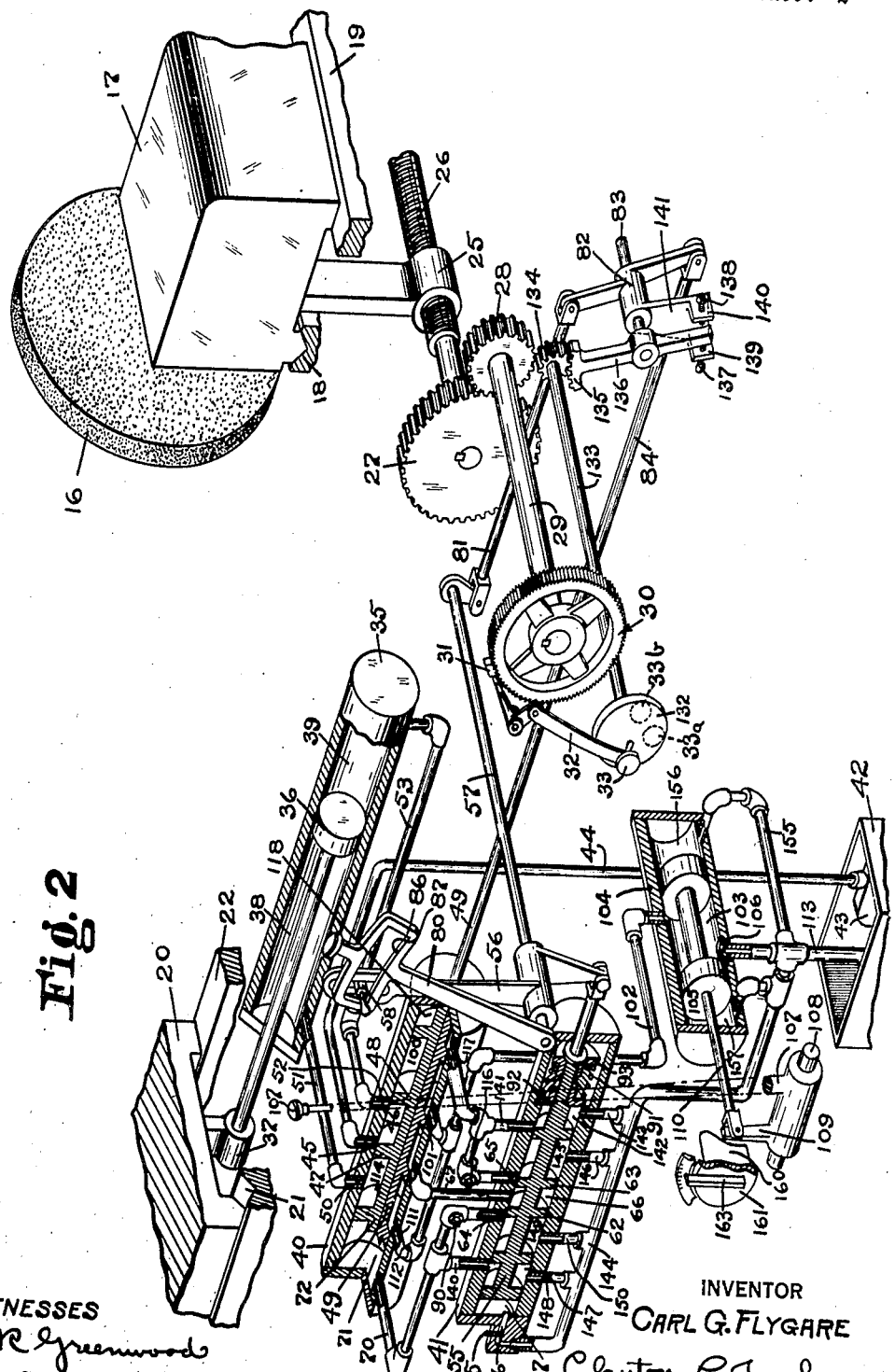

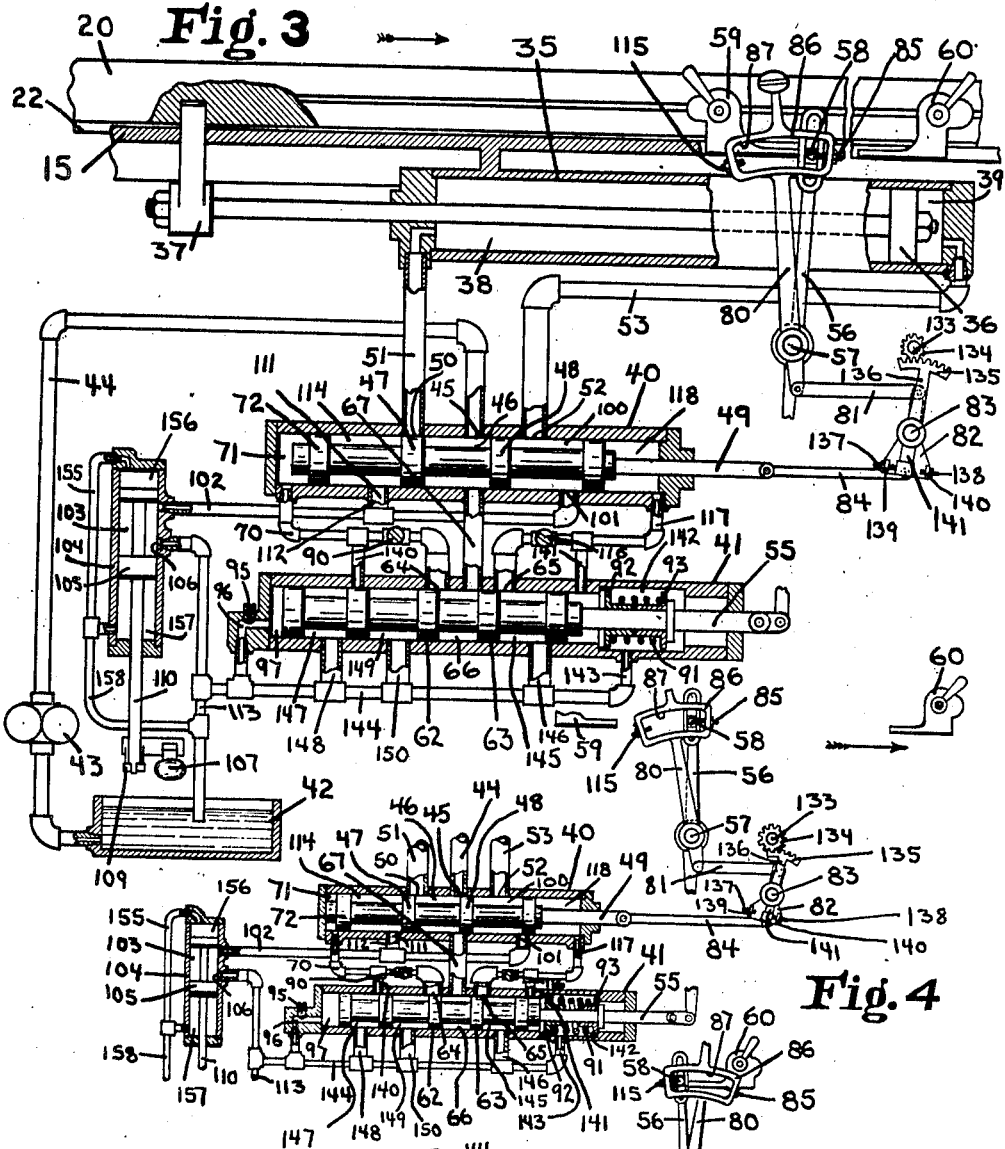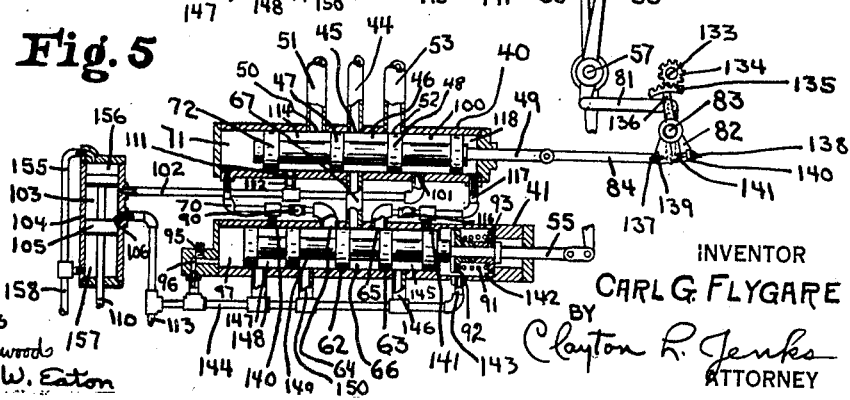

WITNESSES
W.R. Greenwood
Harold W. Eaton

INVENTOR
Carl G. Flygare
BY Clayton R. Jenks
ATTORNEY

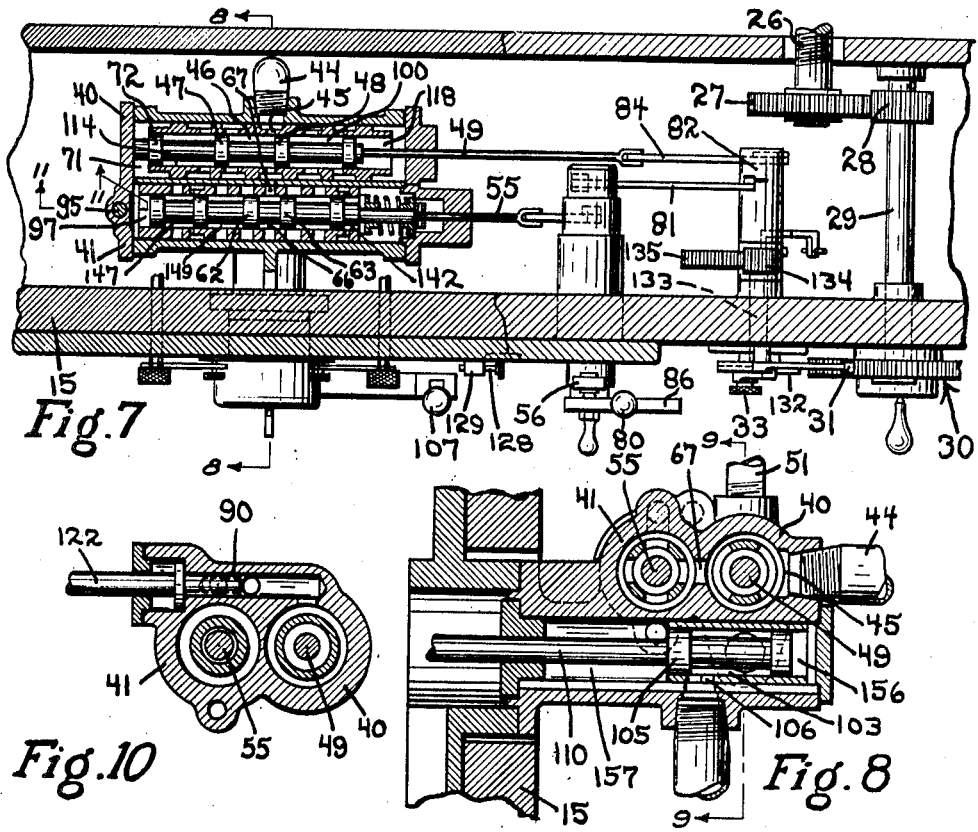
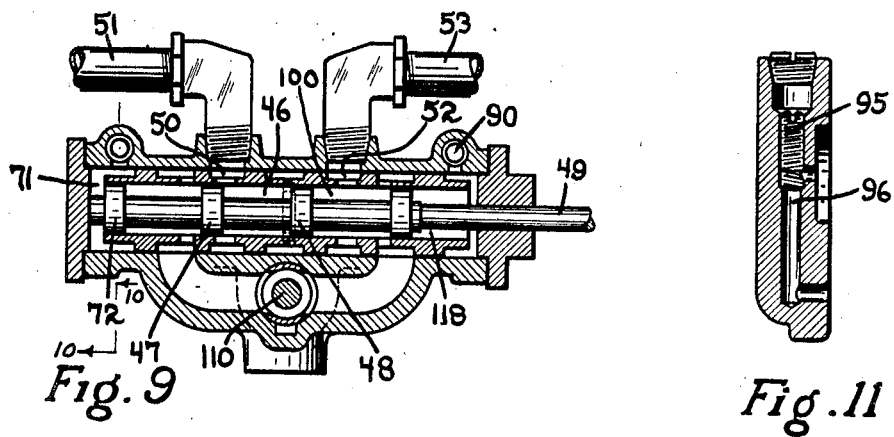

Patented Jan. 3, 1933

1,893,076

UNITED STATES PATENT OFFICE

CARL G. FLYGARE, OF WORCESTER, MASSACHUSETTS, ASSIGNOR TO NORTON COMPANY, OF WORCESTER, MASSACHUSETTS, A CORPORATION OF MASSACHUSETTS

HYDRAULICALLY OPERATED CYLINDRICAL GRINDING MACHINE

Application filed September 30, 1929. Serial No. 396,208.

This invention relates to machine tools, such as cylindrical grinding machines, and more particularly to the table traversing and the wheel feeding mechanisms therefor.

Heretofore, various grinding machines have been developed for traverse grinding in which the work table carrying a rotating work piece is reciprocated relative to the grinding wheel and the wheel is fed towards the work at the end of the table traverse stroke. This wheel feeding movement takes place periodically just before the table comes to rest and prior to its starting in the opposite direction; hence during the final period of travel of the work in either direction, the wheel is doing double duty. Also, if the table starts on its return journey immediately after it comes to rest, there will not be sufficient time for the wheel to cut all the way around the work at the end, and a high spot will be left on the work adjacent the end. For certain types of work which permit the wheel to pass beyond the end of the work, this condition does not detrimentally affect the finished product. However, in the case of shoulder grinding where it is necessary for the operator to traverse grind up to and as close as possible to the shoulder, it is necessary that the grinding wheel completely encircle and grind the portion adjacent to the shoulder to reduce it to the required size. In certain machines employing a mechanical drive for the table, a lost motion clutch has been provided to cause a dwell at the end of the table stroke. This dwell, however, has not been so arranged and coordinated with the wheel feeding mechanism as to cause the wheel to be fed into the work during the period of dwell. This is a desirable feature since a short period of dwell will permit the wheel to take a full depth grind prior to the reversal of the table stroke.

It is accordingly the primary object of this invention to provide suitable work traversing and wheel feeding mechanisms for a grinding machine which are so constructed and coordinated in their movements that the grinding wheel may be fed into the work while the table is stationary at the end of its traversing stroke and prior to its reversal in direction of travel.

It is a further object of this invention to provide a suitable adjustment so that the operator may vary the period of dwell at either end of the table stroke as desired.

It is still another object of this invention to provide a suitable adjustment for the period of dwell and for the time at which the wheel feeding mechanism is actuated so that the work table may come to rest for a brief dwell before the actuation of the wheel feed mechanism and remain stationary for a short period after the wheel has been fed into the work, so as to permit the grinding wheel to grind entirely around the rotating work before the latter starts on its return stroke.

This invention relates further to a hydraulically actuated grinding machine, in which the work carrying table is reciprocated by means of fluid pressure controlled by a reversing valve, and particularly one in which the reversing valve is operated by or in timed relation with the work table movement. In the preferred construction, the reversing valve is actuated by a pilot valve and the latter is moved directly by the table.

A further object of the invention is to provide a hydraulically actuated mechanism for moving the table which is positively governed in its operation by adjustable dogs on the table, and which acts automatically to effect an intermittent reversal of direction of the table movement.

Another object is to provide such a mechanism with a device which governs the movement of the table, and which may be manually controlled to give a desired rate.

Other objects will be apparent from the foregoing disclosure. One embodiment of this invention has been illustrated in the drawings, in which like reference numerals indicate like parts:

Fig. 2 is a diagrammatic perspective view showing the hydraulic traverse mechanism together with the actuating mechanism for the cross feed;

Fig. 3 is a diagrammatic view of the valve mechanism showing the table dog contacting with the pilot valve control lever when the table is moving toward the right as viewed in the figure;

Fig. 4 is a similar fragmentary diagrammatic view of the valves and levers showing the table traveling in a position toward the right before the dog contacts with the pilot valve lever;

Fig. 5 is a similar fragmentary diagrammatic view of the valves showing the position of the levers and the valves at the other end of the table stroke from that shown in Fig. 3;

Fig. 7 is a horizontal sectional view taken approximately on the line 7—7 of Fig. 1 showing the valves and the controlling levers therefor with the valves in the position to correspond with Figs. 1 and 2;

Fig. 8 is a cross sectional view taken approximately on the line 8—8 of Fig. 7;

Fig. 9 is a cross sectional view taken approximately on the line 9—9 of Fig. 8;

Fig. 10 is a cross sectional view taken approximately on the line 10—10 of Fig. 9; and Fig. 11 is a fragmentary sectional view on an enlarged scale taken approximately on the line 11—11 of Fig. 7 showing the valve to throttle the movement of the pilot valve.

Figure 1:
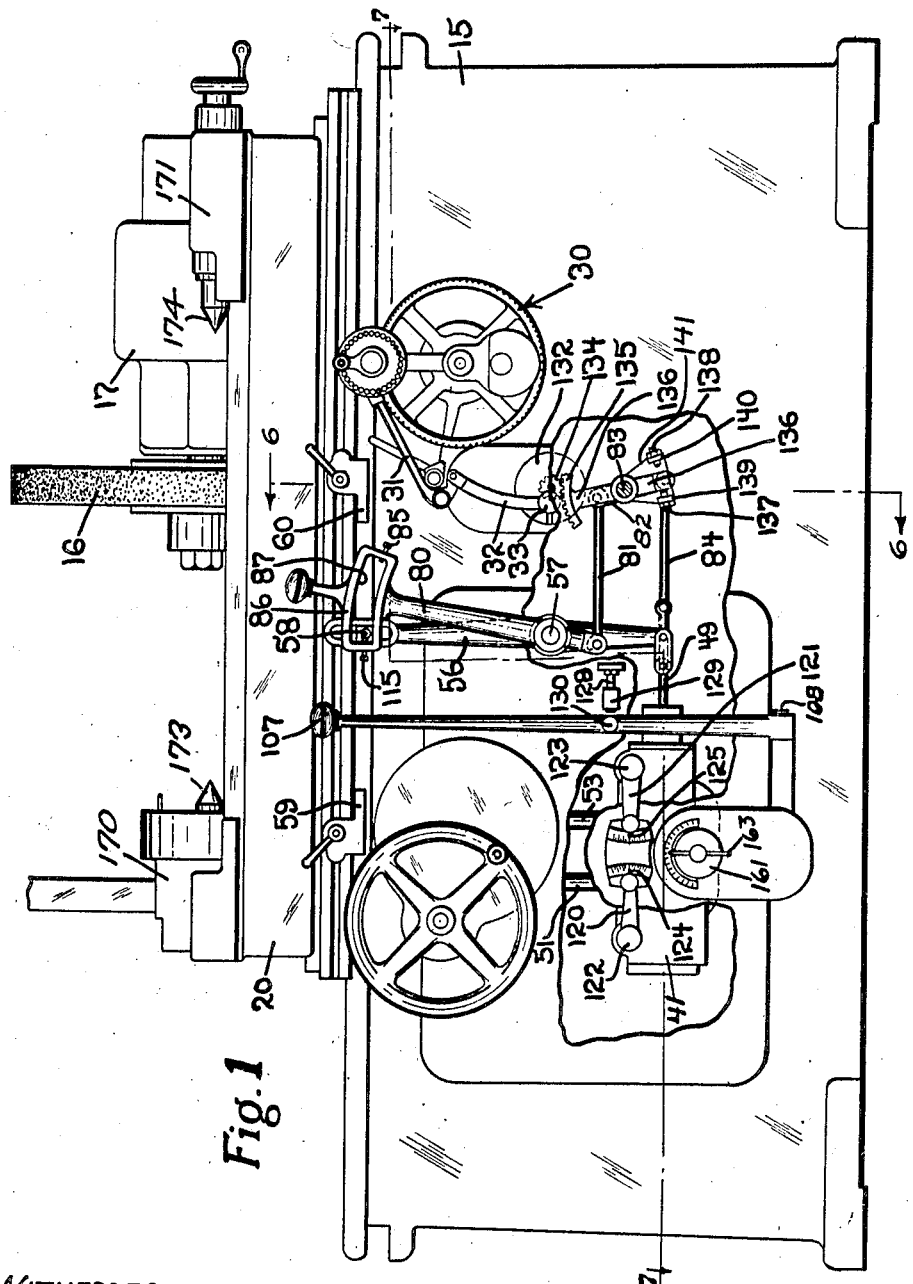
Fig. 1 is a front elevation of a grinding machine embodying this invention.

The specific embodiment of the invention illustrated in the drawings is a grinding machine provided with a suitable hydraulically operated table traversing mechanism which is so arranged that the table may be moved at a desired traversing speed and then caused to dwell at the end of the stroke of reciprocation for a predetermined but adjustable period of time. In this machine, the grinding wheel feeding mechanism comprises a cross feed screw and mechanical actuating device which is operated by the table traversing mechanism to feed the wheel into the work during the period of dwell of the table, and the dwell period is preferably so adjusted that the table will be stationary for a short period both before and after the wheel feed mechanism is actuated. This machine includes a fluid pressure actuated mechanism which is so constructed and arranged that a pilot valve controls the movement of a reverse valve which in turn controls the direction of travel of the work-table. The rate of movement of the table is controlled by an adjustable throttle valve.

As illustrated in the drawings, this grinding machine comprises a base 15 supporting a rotatable grinding wheel 16 on a wheel slide 17 which is in turn mounted on a V-way 18 and a flat way 19 on the base 15. The base also supports a work table 20 which is arranged to slide longitudinally on the base 15 on V-way 21 and flat way 22.

The work table 20 is provided with a headstock 170 and a footstock 171 which may be adjustably positioned in any well known manner to support a work piece for rotation upon the respective centers 173 and 174.

Wheel feeding mechanism

The grinding wheel slide 17 is provided with a depending nut 25 engaging a screw 26 which is rotatably supported in the base 15. The cross feed screw 26 may be rotated by any suitable feeding mechanism, such as that shown in the prior United States patent to Wilcox No. 1,261,083, in accordance with which the feed screw is provided with a gear 27 meshing with a gear 28 on one end of shaft 29. The other end of the shaft 29 carries a feed wheel 30 which may be actuated by a picker or pawl 31 moved through a connecting rod 32 by means of a crankpin 33 on the rotatable plate. As the crankpin 33 is oscillated, the pawl 31 picks up teeth on the wheel and rotates the same, thereby turning the cross feed screw to feed the grinding wheel towards the work. This particular feature is not considered part of the present invention, consequently it has not been illustrated in detail.

Table traversing mechanism

The table 20 may be reciprocated by a suitable mechanism, such as a fluid pressure device, which is so arranged that the table may be caused to dwell for a variable period at either end of the table reciprocation. This mechanism may comprise a cylinder 35 which is supported on the base 15 of the machine. A piston 36 is slidably mounted within the cylinder 35 and connected by a piston rod to a bracket 37 depending from the table 20. By controlling the admission of fluid to the chambers 38 or 39 the direction of travel of the work table 20 may be changed as desired.

To reverse the direction of travel of the table, a fluid pressure system is provided, which includes a reversing valve 40 connected to the cylinder 35 and a pilot valve 41 arranged to shift the reversing valve and thereby change the direction of flow of the fluid to the cylinder 35. A fluid tank 42 is provided in the base of the machine, and fluid is pumped from this reservoir by a gear pump 43 (diagrammatically illustrated in Figs. 2 and 3). This fluid passes through the pipe 44 and port 45 into a chamber 46 in the reversing valve 40 between the pistons 47 and 48 on the valve stem 49. The fluid entering the chamber 46 may then be passed through the port 50 and pipe 51 into the chamber 38 at the left-hand end of the cylinder 35 (Fig. 3), or through port 52 and pipe 53 to the chamber 39 at the right-hand end of cylinder 35.

The valve stem 49 may be shifted to change the direction of flow of the fluid and thereby change the direction of travel of the table by a suitable mechanism, and in the preferred embodiment of the invention, it is preferably actuated by movement of the table to bring the table to a stop. The pilot valve 41 serves to move the reverse valve 40 and start the table in the opposite direction. The pilot valve 41 is provided with a valve stem 55 connected to a lever 56 pivotally mounted on a shaft 57 on the base 15. The upper end of the lever 56 is provided with a pin 58 arranged to be engaged by the adjustable dogs 59 and 60 respectively, as the table is reciprocated.

During the normal travel of the work table 20, the pilot valve 41 is in a neutral position, such as shown in Fig. 4,—that is, with the valve pistons 62 and 63 arranged to cover the ports 64 and 65 respectively. The chamber 66 between the pistons 62 and 63 is connected by a pipe 67 with the chamber 46 in the reversing valve, so that the pipe line pressure is conveyed through the reversing valve chamber 46 into the pilot valve chamber 66.

Assuming the table to be traveling in the direction of the arrow, as shown in Figs. 3 and 4, the valve pistons remain in the position illustrated in Fig. 4 until the dog 59 contacts with the pin 58 and rocks the lever 56 to the position shown in Fig. 3. This movement shifts the valve stem 55 so that pistons 62 and 63 assume the position illustrated in Fig. 3. Movement of the pilot valve 41 to this position opens a port 64 to admit fluid through pipe 70 into the chamber 71 at the left-hand end of the reversing valve 40. This permits the fluid pressure within the circuit to pass back of the piston 72 on the stem 49 to move the valve stem 49 toward the right as viewed in Fig. 3.

One feature of this invention involves provisions whereby the table may be stopped and the reverse valve closed so as to produce a definite period of dwell at each end of the table stroke. To this end, a suitable lever mechanism is arranged to be actuated in timed relation with the lever 56 which actuates the pilot valve 41. This may comprise a lever 80 fastened to the outer end of the shaft 57 on the base 15. The other end of the shaft 57 is provided with an arm connected by a link 81 with a bell crank lever 82 pivotally supported on a shaft 83. The other end of the bell crank 82 is pivotally connected to a link 84 which is connected to the reverse valve stem 49.

As the table travels in the direction of the arrow shown in Fig. 4, the dog 59 strikes the pin 58 which starts to swing the lever 56. This continues until the pin 58 strikes an adjustable screw 85 in an enlarged portion 86 of the lever 80. The enlarged portion 86 is provided with an elongated slot 87 which permits movement of the pin 58 within the slot without transmitting motion to the lever 80 and shaft 57. Continued movement of the table in the direction of the arrow (Fig. 4), rocks both the lever 56 and the lever 80 to positively move the valve stem 49 until the valve piston 47 closes the port 50 and thereby prevents further traversing movement of the table 20.

During this movement of the valve piston 47 into the position illustrated in Fig. 3, the valve stem 55 has moved to the position also shown in Fig. 3, so that the fluid pressure passing into the chamber 46 of the reverse valve 40 passes through the pipe 67, chamber 66, port 64 and pipe 70 into chamber 71 to move the piston 72 and the valve stem 49 toward the right, as viewed in Fig. 3. The fluid pressure back of the valve piston 72 moves the reversing valve stem 49 while the table is stationary. This movement continues until the port 52 is opened so that fluid may be admitted from chamber 46 through port 52 and pipe 53 into the cylinder chamber 39 at the right-hand end of cylinder 35 (Fig. 3) to start the movement of the table in the reverse direction.

In order that the period of dwell may be varied, a suitable valve 90 is interposed in the pipe 70 so that by adjustment of the aperture of the valve, the operator may control the volume of fluid passing through the pipe 70 and consequently control the speed of movement of the reversing valve and the dwell for the table during the period of reversal. By varying the position of the valve 90, this period of dwell may be regulated according to the desires of the operator.

After the reversal has taken place, the pilot valve stem 55 is preferably automatically returned to a neutral position where both the ports 64 and 65 are closed, as illustrated in Fig. 4. This may be accomplished by means of a spring 91 interposed between the collars 92 and 93 which are slidably mounted on the valve stem 55. In the neutral position, the collars 92 and 93 engage shoulders within the valve casing 41. The valves and spring 91 remain in the positions illustrated in Fig. 3 until the table moves in the reverse direction. As soon as the table movement is reversed, the dog 59 recedes from the pin 58 and the released pressure of the spring 91 tends to return the valve stem 55 into a neutral position, such as that shown in Fig. 4.

The return movement of the pilot valve stem 55 to a neutral position is preferably retarded to give ample time for the fluid passing through the pipe 70 to shift the reverse valve stem 49, so that the port 52 is fully open before the pilot valve stem 55 reaches its central or neutral position. To this end, a suitable means is provided which comprises a valve screw 95 arranged to throttle a passage 96, thereby serving to create a suction within the chamber 97 and retard the return movement of the valve stem 55 to its central position. This is an important feature of this invention, since by manipulation of the screw 95, the return may be delayed or hastened as desired.

During the movement of the table in the direction of the arrow, as shown in Figs. 3 and 4, fluid is exhausting from the chamber 39, pipe 53, port 52, valve chamber 100, port 101, and pipe 102 into a chamber 103 in the speed control valve 104. This valve 104 is of the balanced piston type and is provided with a piston 105 arranged to slide within the valve 104 and permit the port 106 to remain entirely open or partially closed as desired to control the exhaust of fluid through the system. This valve may be controlled by any suitable mechanism, such as a lever 107 pivotally mounted on a stud 108 on the base 15. This lever is provided with a second arm 109 connected to the valve stem 110 so that the piston 105 may be manually controlled as desired. When it is desired to stop the machine and prevent reciprocation of the table, the operator moves the lever 107 towards the machine, as viewed in Fig. 2, to move the piston 105 so that it closes the port 106 and thereby prevents exhaust of fluid from the system. By varying the position of the lever 107 the port 106 may be either wide open to give a maximum speed of the table or partially closed to throttle the table to the desired traversing speed.

When the table is traversing toward the left the port 52 is open and admitting fluid under pressure through the pipe 53 into the chamber 39 at the right-hand end of the cylinder 35, and the fluid in the chamber 38 exhausts through the pipe 51, and port 50, chamber 114 in the valve 40, through a port 111 and pipe 112 into the exhaust pipe 102 and from there into the chamber 103, through the adjustable throttling port 106, whence it returns through the pipe 113 into the reservoir 42.

Movement of the table 20 towards the left continues until the dog 60 strikes the pin 58 and rocks the lever 56 toward the left to shift the pilot valve stem 55 from a neutral position as viewed in Fig. 4 towards the right into the position shown in Fig. 5. Simultaneously with this movement the pin 58 contacts with an adjustable screw 115 at one end of the enlarged portion 86 of the lever 80 and moves both of the levers 56 and 80 towards the left placing the valves 40 and 41 in position so that the piston 48 covers the port 52 and the pilot valve has opened port 65 as illustrated in Fig. 5. When the parts are in these positions, the table is stationary and fluid is being admitted through the pipe 67, chamber 66, port 65, pipe 117 into chamber 118 to shift the reversing valve towards the left and thereby start the table traveling in the other direction.

After reversal takes place, the pilot valve stem 55 returns to a neutral position and the reversing valve stem 49 assumes the position shown in Fig. 4 so that fluid passing through the pipe 44, port 45, into chamber 46 passes through the port 50, pipe 51, into the chamber 38 to move the piston and also the table 20 in a direction towards the right. A suitable valve 116 is interposed in the pipe 117 to permit the dwell at the right-hand end of the table stroke to be varied as desired.

As soon as the table starts moving toward the right, the dog 60 moves away from the pin 58 and the released pressure of the spring 91 moves the pilot valve stem 55 into a neutral position. The chamber 97 at the left-hand end of the pilot valve now serves as a dash-pot to squeeze oil out past the valve screw 95 and pipe 96 into the exhaust pipe 113. This serves to check the return movement of the pilot valve, so as to insure sufficient fluid passing through the pipe 117 to throw the reversing valve into its reversing position where the port 50 is fully open to produce the normal table travel in a direction towards the right (Fig. 4).

It will be readily apparent from this disclosure that by manipulating the valves 90 and 116, the speed of movement of the reversing valve may be controlled to give the desired dwell at each end of the table stroke. The valves 90 and 116 may be controlled by any suitable mechanism, such as the levers 120 and 121 respectively, which are mounted on the ends of the valve stems 122 and 123. These arms are provided with suitable index points 124 and 125 so that the operator may readily turn the valves in accordance with a graduated scale to give the desired dwell at either end of the table stroke.

The valves 90 and 116 serve to regulate the passage of fluid to actuate the reverse valve. It is desirable, however, that suitable provision be made so that these valves will not check the exhaust or drainage from the idle chambers 71 or 118. To permit unrestricted passage from these chambers, a pair of pipes 140 and 141 are provided so that when fluid is being forced through the pipe 70 into the chamber 71, (see Fig. 3), fluid in the chamber 118 may freely exhaust through the pipe 117 and through the pipe 141, chamber 142, pipe 143, pipe 144, and into the exhaust pipe 113 back to the reservoir 42. Fluid in the chamber 118 may also exhaust through the partially opened valve 116, through the pipe 117, port 65, chamber 145, pipe 146 and then through pipe 144 and pipe 113. When the valves are in the opposite positions, such as that shown in Fig. 5, and fluid is being forced through port 65 into the valve chamber 118, fluid may readily exhaust from the chamber 71 through the pipe 70, into the chamber 147, pipe 148, and out through the pipe 144 and exhaust pipe 113 into the reservoir. Fluid may also exhaust from the chamber 71 through pipe 70, valve 90, port 64, chamber 149, pipe 150 into pipe 144 and from there through the exhaust pipe 113 into the reservoir 42.

Speed control

The normal speed of the table may be controlled by means of a lever 107 which is connected to the valve stem 110 to position the piston 105 relative to the elongated port 106 so as to control the exhaust of fluid from the system. When it is desired to stop the traverse of the work table, the operator moves the lever 107 towards the front of the machine, and so moves the valve stem 110 and piston 105 to cover the port 106 and thereby stop the table movement. It is desirable to provide a suitable stop for the lever 107 so that the movement of the stem 110 of the piston valve 105 in opening the valve port 106 may be limited. This permits the operator to set the mechanism for a desired table speed and be sure of returning to the same speed after the machine has been stopped. This may be accomplished by means of a cam 160 on the rotatable member 161 mounted on the front of the machine base 15. The surface of the cam is so shaped and arranged as to engage a pin 162 projecting from the valve stem 110 so as to limit the movement of the piston 105 toward the left, as viewed in Fig. 6. By turning the knob 163, the cam 160 may be rotated and adjusted relative to the pin 162 so as to permit opening the valve piston 105 to uncover the desired amount of the exhaust port 106 and thereby control the normal table speed.

Figure 6:
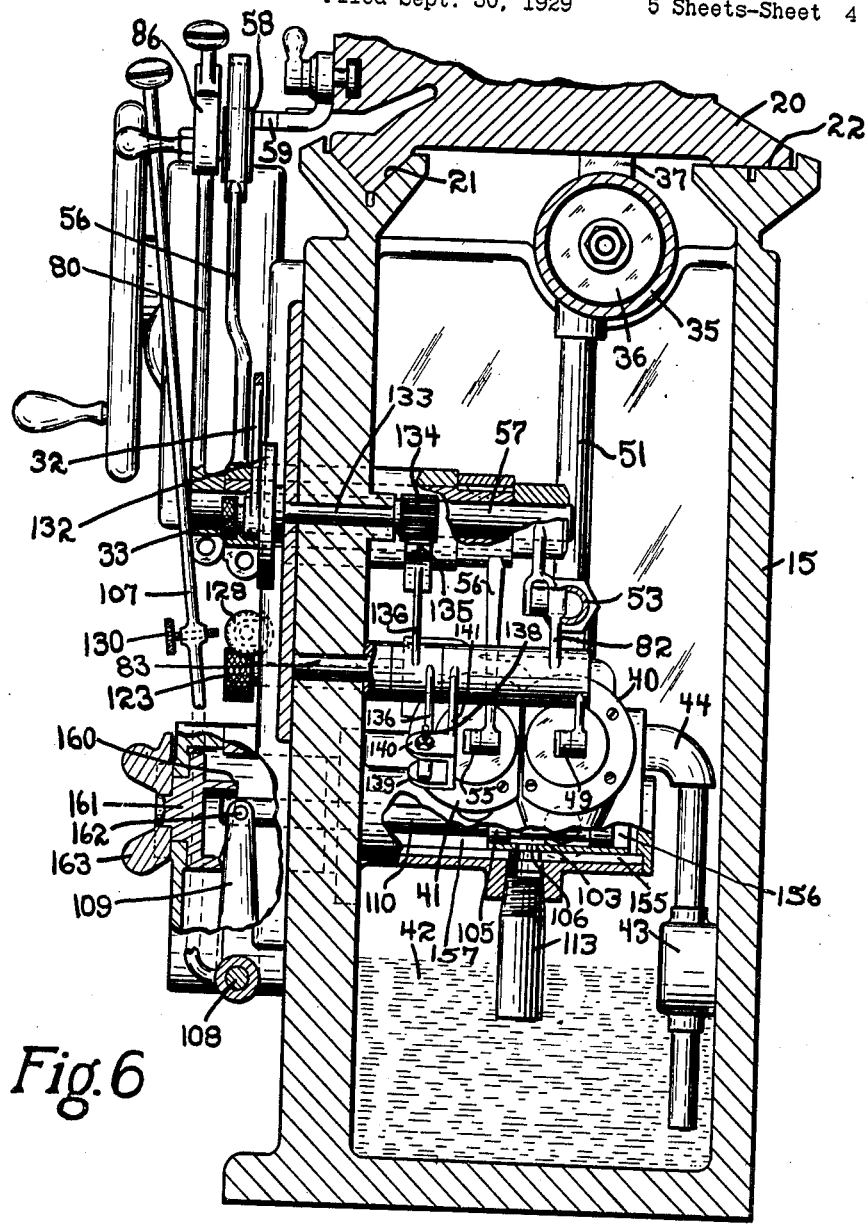
Fig. 6 is a cross sectional view taken approximately on the line 6—6 of Fig. 1 showing the lever mechanism and the valve actuating device on an enlarged scale.

To permit free movement of the piston 105 in the speed control valve, a suitable by-pass is provided which may comprise the pipe 155 as shown diagrammatically in Figs. 3, 4 and 5, or a passage as shown in Fig. 6. This pipe or passage 155 connects the chamber 156 at one end of the valve casing with the chamber 157 at the other end and is also connected by a pipe 158 with the exhaust pipe 113 so that any leakage of oil by the piston 105 is exhausted so as to permit free movement of the valve piston 105.

Truing speed

It is desirable in a machine of this type to provide a slow speed of the table which is suitable for truing the grinding wheel. This requires a slow but uniform movement of the table which is much slower than the normal speed of the table during grinding. This may be accomplished by providing a positioning device which will serve as a stop to limit the movement of the valve piston 105 to control the aperture of the elongated port 106. This may be accomplished by means of a plunger 128 mounted on a boss 129 on the front of the machine base. This plunger 128 is arranged so that it may be moved longitudinally towards the left, as viewed in Fig. 1, so that the end of the pin passes in back of the lever 107 and serves to limit the movement of the lever 107 towards the machine. This plunger serves as a stop and permits the operator to readily move the parts so as to produce a slow movement of the table for truing the wheel.

It is desirable that the mechanism be provided with a suitable adjustment so that the operator may change the truing speed to produce the desired surface on the periphery of the wheel. A suitable adjusting screw 130 may be provided on the lever 107 which is arranged so as to engage the pin 128, when it is in an operating position at the left, as viewed in Fig. 1. By manipulation of the screw 130, the operator may adjust the aperture of the valve port 106 to produce the desired truing speed. It will be readily apparent from this construction, that when it is desired to true the wheel the operator moves the lever 107 outwardly from the base, slides the pin 128 towards the left, as viewed in Fig. 1, and then moves the lever 107 towards the front of the machine until the adjusting screw 130 contacts with the plunger 128 to limit the movement of the valve piston 105, to give the proper speed of the table for truing the wheel.

Feed of wheel during dwell

To attain one of the objects of this invention, it is desirable to provide a mechanism which is so arranged that the infeed of the grinding wheel takes place while the table is stationary. This is preferably accomplished by connecting the hydraulic table traverse mechanism with the feed mechanism in such a way that it operates to turn the feed screw 26 during the period of dwell at the end of the table stroke. It is desirable in traverse grinding that the table come to a stop and the work have a chance to dwell so that at least one or more complete rotations of the work takes place before the feeding of the wheel, so that the grinding wheel will grind out on one cut before it is advanced for its cut on the return stroke. It is also desirable that the work rotate at least a full revolution after the feeding movement before the table traverse begins, so that there is no portion of the work which is not acted upon by the grinding wheel. This may be accomplished by a suitable mechanism which is actuated in timed relation with the hydraulic traverse mechanism. For this purpose, there is provided a rotatable plate 132, supporting the crankpin 33, and mounted on the outer end of a shaft 133 which is rotatably supported in the base 15. The other end of the shaft 133 is provided with a pinion 134 meshing with a gear segment 135 formed on one end of a lever 136 which is pivotally mounted on the shaft 83. The other end of the lever 136 is arranged to engage the screws 137 and 138 mounted in the lugs 139 and 140 projecting from a lever 141 which is preferably formed as an integral part of the bell crank 82. The bell crank lever 82 is rocked by the movement of the table and also by an endwise movement of the reversing valve through the valve stem 49 and link 84.

It will be readily apparent from this disclosure that rocking movement of the bell crank lever 82 will be transmitted through the screws 137 and 138 to rock the lever 136 which in turn moves the gear segment 135 and causes a partial rotation of the gear 134. This movement of the lug 139 also rocks the shaft 133 and the plate 132 to transmit a rocking motion to the crankpin 33 and through the connecting link 32 and pawl 31 actuates the feed wheel 30 and thereby rocks the shaft 29, the gear 28, gear 27 and feed screw 26 to move the wheel slide 17 and feed the grinding wheel 16 towards the work. By adjusting the position of the crankpin 33 relative to the axis of the shaft 133, the extent of feeding movement may be varied as desired. This adjustment is not considered a part of this invention and consequently has not been illustrated in detail. For further reference to details of this feeding mechanism reference may be had to the prior patent to Wilcox No. 1,261,083.

Assuming the table to be traveling in the direction of the arrow, as shown in Figs. 3 and 4, the movement continues until the dog 59 strikes the pin 58. This table movement rocks the lever 56 until the pin 58 contacts with the screw 85 and from then on both the lever 56 and the lever 80 are moved together. When the lever 80 starts its movement, it operates to rock the shaft 57, the link 81 and the bell crank 82 so that the bell crank 82 moves from the position shown in Fig. 3, with the lever 136 contacting with the adjusting screw 138, and rocks the lower end of the lever 82 towards the right, as viewed in Fig. 3, until the stop screw 137 contacts with the lever 136. This movement is an idle movement and there is no motion transmitted to the lever 136. This permits a period of dwell before the actuation of the feeding mechanism. Continued movement of the bell crank, after the screw 137 contacts with the lever 136, by the rocking movement of the lever 80 is transmitted through the gear segment 135, pinion 134 and shaft 133 to actuate the feeding mechanism and produce the desired infeed of the grinding wheel. After the pilot valve has shifted in either direction, a movement of the reversing valve through valve stem 49 and the connecting rod 84 operates to rock the bell crank lever 82 through a further amount.

When one of the dogs strikes the pin 58 to rock the levers 80 and 56, the lost motion between the lever 136 and the screws 137 and 138 permits a period of dwell before the screw 137 contacts with the lever 136 to actuate the feed mechanism. After movement of the levers 80 and 56 due to the table movement, the screw 137 contacts with the lever 136 to actuate the gear segment 135, the pinion 134, shaft 133 and plate 132 to rock the crankpin 33. The downward pull of the connecting link 32 and pawl 31 rotates the feed wheel 30 in a counter-clockwise direction. Movement of the crankpin 33 from the initial position, indicated in full lines in Figs. 1 and 2, to position 33a causes an infeed of the grinding wheel. This may take place during the initial movement of the reverse valve 40 after the pilot valve 41 has moved a sufficient distance to admit fluid back of either end of the pistons to move the reversing valve under hydraulic power. This rocking movement of the crankpin 33 continues due to movement of the valve 40 until the crankpin 33 assumes the position 33b. During the downward movement of the crankpin 33 to position 33a an infeed of the grinding wheel is obtained. During the remaining upward movement of the pin 33 from the position 33a to 33b, the pawl 31 rides idly over the feed wheel 30 and returns to its initial position ready to start an infeed on the return motion of the pin 33 from position 33b. It will be readily apparent from this disclosure that the mechanism is so arranged that a definite period of dwell is obtained before the infeed of the wheel and the lost motion or return of the feed pawl between positions 33a and 33b causes a period of dwell after the feeding of the wheel and before the table starts its movement in the reverse direction.

Having thus described the invention, what I claim as new and desire to secure by Letters Patent is:

1. A grinding machine comprising a reciprocable work table, means to mount a work piece thereon, a grinding wheel arranged to grind the work, a fluid pressure chamber and a piston therein operatively connected to reciprocate the work table, a reverse valve arranged to direct fluid pressure to either end of said fluid pressure chamber and thereby control the direction of table movement, mechanism arranged to shift the reverse valve to a neutral position and thereby positively stop the table movement when it has reached a predetermined position, a fluid pressure operated device to move the reverse valve from the neutral to a reverse position and change the direction of table movement, and means to delay the latter movement of the reverse valve to cause a predetermined dwell at the end of each table stroke.

2. A grinding machine comprising a reciprocable work table, means to mount a work piece thereon, a grinding wheel arranged to grind the work, a fluid pressure chamber and a piston therein operatively connected to reciprocate the work table, a reverse valve arranged to direct fluid pressure to either end of said fluid pressure chamber and thereby control the direction of table movement, mechanism arranged to shift the reverse valve to a neutral position and thereby positively stop the table movement when it has reached a predetermined position, a fluid pressure operated device to move the reverse valve from the neutral to a reverse position and change the direction of table movement, means to delay the latter movement of the reverse valve to cause a predetermined dwell at the end of each table stroke, and means for adjusting the rate of flow of fluid to the reverse valve and thereby varying the period during which the table dwells.

3. A grinding machine comprising a reciprocable work table, means to mount a work piece thereon, a grinding wheel arranged to grind the work, a fluid pressure chamber and a piston therein connected to reciprocate the table, a reverse valve mechanism arranged to direct fluid pressure to either end of said fluid pressure chamber and thereby control the direction of table movement, mechanical means to automatically move the reverse valve to a neutral position and stop the table movement when the table has reached a predetermined position, a fluid pressure operated device to move the reverse valve at the end of each table reciprocation to start the table movement in the other direction, and adjusting devices independent of each other which may be individually regulated to automatically control the movement of the reverse valve at the termination of each table stroke, and thereby cause a dwell of the table for individually variable amounts at the end of each table reciprocation.

4. A grinding machine comprising a reciprocable work table, a grinding wheel, a fluid pressure cylinder and piston mechanism operatively connected to move the table, means including a reversing valve to control the fluid flow to said cylinder and cause the piston and table to reciprocate, adjustable means operated by the table mechanism to shift the reversing valve to a neutral position and stop the movement of the table when it has reached a predetermined position, and means including a lost motion device operatively associated with the reversing mechanism to control the speed of movement of the reversing valve and cause the table to dwell for a predetermined period at the end of each stroke.

5. A grinding machine comprising a reciprocable work table, a grinding wheel arranged to move towards the work to grind the same, mechanism to reciprocate the table, means actuated by the table to stop said mechanism and the table when the table has moved to a predetermined but adjustable position, adjustable means to cause it to dwell for a predetermined but variable extent at the end of its stroke, and means acting in timed relation with the table movement to feed the wheel towards the work only during the dwell period.

6. A grinding machine comprising a reciprocable work table, a grinding wheel, mechanism to reciprocate the table, automatically operated cross feed mechanism to feed the wheel into the work after the table has reached the end of its stroke, and finely adjustable means operatively associated with the wheel feeding mechanism to cause the table to dwell for a predetermined but variable period at the end of its reciprocating stroke before and after the wheel is fed into the work.

7. A grinding machine comprising a reciprocable work table, a grinding wheel movable towards and from the work, fluid pressure operated mechanism including a fluid pressure chamber, a piston therein and a reversing valve to reciprocate the table, cross feed mechanism to feed the wheel forward into the work after the table reaches the end of its stroke, and means including a pilot valve operated in timed relation therewith to cause the table to dwell at the end of its stroke both before and after the wheel is fed forward.

8. A grinding machine comprising a reciprocable work table, means to secure a work piece thereon, a grinding wheel arranged to move towards the work to grind the same, mechanism to reciproate the table, means including adjustable devices on the table to control said mechanism and stop the table movement when it has reached either of two predetermined end positions thereby limiting its extent of travel in both directions, a further means operated by said table to actuate said mechanism and start the table movement in the opposite direction after its movement has been stopped for a predetermined period of dwell, and adjustable means for varying said period of dwell.

9. A grinding machine comprising a reciprocable work table, a grinding wheel movable towards the work, reversing mechanism to reciprocate the table, adjustable means upon the table to move said reversing mechanism to an inoperative position and stop the table at a predetermined position at each end of its stroke, independent means associated therewith to cause the table to dwell at the end of its stroke, means to vary the period of dwell, and cross feed mechanism operating in timed relation with the table movement which serves to feed the wheel into the work only during said dwell period.

10. A grinding machine comprising a reciprocable work table, a fluid pressure actuated system including a chamber and a piston therein connected to move the table, a reversing valve to control the direction of flow of fluid to said chamber, means on said table engageable with said reversing valve to shift said valve to a neutral position and stop the table when it has reached a predetermined position, a pilot valve to actuate the reversing valve, a throttle valve to control the fluid flow and regulate the rate of movement of the table, and means acting in timed relation with the table movement to actuate the pilot valve and cause a reversal of movement of the table.

11. A grinding machine comprising a reciprocable work table, a fluid pressure system including a chamber and a piston therein connected to move the table, a reversing valve to control the direction of flow of fluid to said chamber and a pilot valve to actuate the reversing valve, adjustable dogs on the table, and valve control means actuated by said dogs which connect with the reversing valve to stop the table movement and with the pilot valve to shift the reverse valve and cause the table to start in the opposite direction.

12. A grinding machine comprising a reciprocable work table, a fluid pressure actuated system including a chamber and a piston therein connected to move the table, a reversing valve to control the direction of fluid flow to said chamber, a pilot valve arranged to actuate the reversing valve, a lever actuated by a dog on the work table to operate the pilot valve and thereby move the reversing valve, causing a reversal of table movement, and independently actuated means to automatically shift the pilot valve to a neutral position when the table dog has disengaged said lever after reversal of the table.

13. A grinding machine comprising a reciprocable work table, a fluid pressure system including a chamber and a piston therein to move the table, a reversing valve to control the direction of flow of fluid to the chamber, adjustable means upon the table to move the reversing valve to an inoperative position and thereby positively stop the table movement when it has reached a predetermined position, a pilot valve to actuate the reversing valve, means to delay the operation of said reversing valve, means acting in timed relation with the table movement to move the pilot valve when the table reaches the end of its stroke, a spring serving to move the pilot valve to a neutral position when released by said means, and a dash-pot acting to control the rate of movement of the pilot valve.

14. A grinding machine comprising a reciprocable work table, a fluid pressure chamber having a piston therein arranged to reciprocate the table, a grinding wheel arranged to grind said work, a reversing valve connected to direct a flow of fluid toward and from said chamber to cause a table reciprocation, adjustable dogs on said table, a device to position said reversing valve including a lever which may be positioned in the path of said dogs and engaged thereby to shift said valve to a neutral position and stop the table at a predetermined position, a pilot valve to further actuate the reversing valve by fluid pressure, means acting in timed relation with the table movement to shift the pilot valve when the table has reached the end of its stroke, an independent means serving to return the pilot valve to a neutral position, means to relay the fluid pressure control of said reversing valve whereby a definite predetermined dwell may be caused at the termination of each table stroke.

Signed at Worcester, Massachusetts, this 28th day of Sept., 1929.

CARL G. FLYGARE.